Patented Nov. 11, 1941

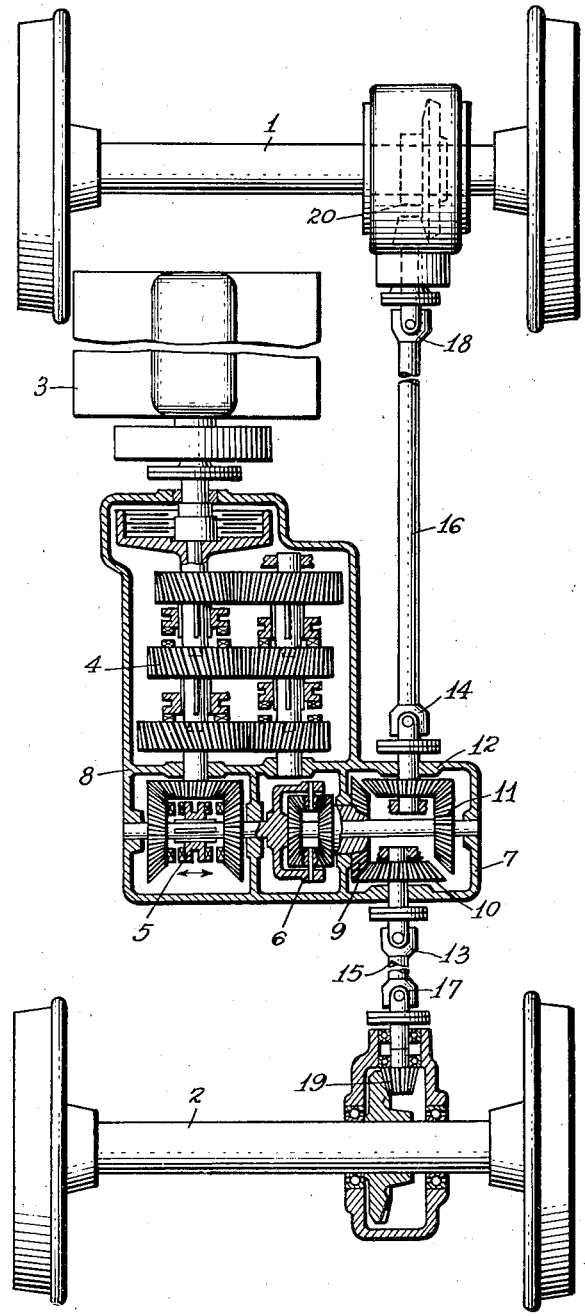

2,262,710

UNITED STATES PATENT OFFICE 2,262,710

TRANSMISSION FOR RAIL CARS DRIVEN BY INTERNAL COMBUSTION ENGINES

Richard Lang, Ravensburg, Wurttemberg, Germany, assignor to Maybach-Motorenbau G. m. b. H., Friedrichshafen, Bodensee, Germany Application November 3, 1938, Serial No. 238,675
In Germany November 16, 1937

3 Claims. (Cl. 74—326)

This invention relates to vehicles such as rail cars employing internal combustion engines and wherein the driving power of the engine is applied to a plurality of wheel axles. The invention is directed to an improved mechanism for transmitting power from the engine to the wheel axles.

According to the invention the power transmitting mechanism, as conventionally, will include a variable speed transmission, reversing mechanism, and differential mechanism to which the power of the common engine can be simultaneously applied to the different wheel axles. One object of the invention is to provide an arrangement of these various mechanisms such that the driving construction at the respective axles is simplified, and the amount of unsprung weight on the axles minimized. Instead of using separate reverse mechanisms at each axle which adds to the unsprung weight and necessitates long transmission linkage, a single, simpler and lighter reverse mechanism is employed for both driven axles which is carried as a part of the sprung weight of the vehicle, and which at the same time is so arranged as to be operative to provide driving power for both axles for all speed ratios of the variable speed transmission mechanism for movement of the vehicle in opposite directions.

Essentially the invention consists in the incorporation of the variable speed transmission, the reverse mechanism and the differential mechanism into a compact power transmitting unit which may be, and preferably is, housed in a common casing carried as a part of the sprung weight of the vehicle. The various mechanisms are so organized in the unit in relation to each other as to occupy a minimum of space and require only a minimum of operating parts. The power of the vehicle engine will leave such unit with the desired angular velocity and with the desired direction of rotation depending on the setting of the reversing mechanism, and can be separately transmitted to the several wheel axles through longitudinally extending propeller shafts. The propeller shafts can be connected with their respective axles through a simple driving unit such as a bevel or worm gear drive and the latter can be relatively small and light in weight as compared with the driving unit carried by the axles according to prior known arrangement in rail cars.

A further particular feature of the invention includes the arrangement of the differential mechanism. The same is disposed adjacent the rear end of the variable speed mechanism for rotation about a crosswise extending axis. This has several important practical advantages. Besides providing compactness of the power transmitting unit it enables the same to be mounted in the vehicle with the axes of the variable speed mechanism extending lengthwise of the vehicle, parallel to and laterally offset from the axle propeller shafts. The final power ouput section of the transmitting unit can be interposed between input ends of the axle propeller shafts, and such propeller shafts separately driven from the differential mechanism through head gears forming a part of the unit. Since the rotational axis of the differential extends at right angles to the power ouput end of the variable speed transmission, gearing must be employed to provide a driving connection between the two mechanisms. This is accomplished without the use of surplus gears by utilizing a reversing mechanism involving an arrangement of gears such as not only to perform its general purpose of changing the direction of rotation, but also deliver power to the differential in a direction at right angles to the direction the reversing mechanism receives the power from the variable speed mechanism.

The various features and advantages of the invention will be understood by reference to the embodiment thereof shown in the accompanying drawing which shows a simplified top plan view of a rail car complete power assembly, the chassis and other parts of the car omitted for purposes of clarity. Certain casing parts in the drawing are broken away to illustrate the essential features of the inventive structure.

In the embodiment illustrated the front and rear wheel axles of the rail car are indicated as I and 2. An internal combustion engine for driving the car is shown at 3, the same extending lengthwise of the vehicle. Power is transmitted to the respective axles from the motor through oppositely directed propeller shafts 15 and 16 which extend lengthwise of the car.

According to the invention a variable speed transmission either of the gear or fluid type, reversing mechanism and differential are interposed between the engine and the respective axle propeller shafts 15 and 16. These mechanisms are arranged in series in a compact operative unit, and are preferably mounted in a common casing 8. The variable speed transmission is generally designated 4 and delivers power from the internal combustion motor 3 through a power output shaft 21 at its rear end which is parallel to and laterally offset from the axle propeller shafts 15 and 16. A reversing mechanism generally designated 5, and a differential indicated at 6 are both mounted at the rear end of the variable speed transmission 4 in an extension 8' of the casing 8. The reversing mechanism and differential are carried by a transverse shaft 22 extending at right angles both to the output shaft 21 of the transmission and the propeller shafts 15 and 16. The reversing mechanism includes a pair of bevel gears 25 and 35 meshing with bevel gear 31 fixed to power output shaft 21 of the gear transmission. Gears 25 and 35 are mounted on shaft 22 and can be selectively locked to said shaft through double claw clutch sleeve 45 which is splined to shaft 22 for movement in opposite directions to engage corresponding claws on gears 25 and 35.

The differential 6 is selectively driven from the variable speed transmission through the reversing mechanism just described in both directions, and includes a yoke member 26 fixed to shaft 22, a pair of orbital bevel gears 36 carried by the yoke and a pair of bevel gears 46 and 56 coaxial with shaft 22. Gear 46 is fixed to shaft 23 aligned with shaft 22, and gear 56 is rotatably mounted on shaft 23.

A propeller shaft head 7 forms a lateral extension of casing section 8' and houses suitable gears for transmitting the power from the differential to the respective propeller shafts. In the present embodiment the drive to propeller shaft 15 is effected through a pair of meshing bevel head gears 9 and 10. Gear 9 is suitably secured to gear 56 of the differential for rotation on shaft 23, and gear 10 connects with propeller shaft 15 through a universal joint 13. A similar set of head gears is provided for driving the second axle and includes gear 11 fixed to shaft 23 and rotatable therethrough by gear 46 of the differential, and gear 12 which connects with propeller shaft 16 through a universal joint 14.

The arrangement of the various parts as a unit not only provides an efficient and compact operative arrangement utilizing a minimum of parts, but also simplifies the driving connections between propeller shafts 15 and 16 and axles 1 and 2. Instead of utilizing a differential or reversing mechanism on the axles, propeller shafts 15 and 16 connect with their respective axles through universal joints 17 and 18 and simple axle drive gears 19 and 20. As will be clear from the drawing the construction of the latter gears is quite simple and the same may be made compact and light. The unsprung weight, that is the weight directly carried by the axles, is at a minimum, for all of the operating units of the transmission system are carried by the frame (not shown) of the car in the power transmitting unit housed in casing 8.

The types of variable speed transmission, reversing mechanism, differential and head gears shown in the drawing may of course be varied as will be evident to those skilled in the art, and the scope of the invention is to be determined according to the appended claims.

I claim:

1. In a car powered by an internal combustion motor and having forward and rear wheel axles driven through separate longitudinally extending propeller shafts, a power transmitting unit comprising a variable speed transmission in driving connection with the motor, a shaft member mounted at the power output end of the transmission and extending in a direction crosswise of the transmission power output end in a direction at right angles to the propeller shafts, reversible gear mechanism forming a driving connection between the power output end of the transmission and one end of said crosswise shaft member, a differential mounted on the other end of said shaft member and driven by said shaft member, and gear means forming separate driving connections between the differential and the respective propeller shafts.

2. In a car powered by an internal combustion motor and having a forward and rear wheel axles driven through separate longitudinally extending propeller shafts, a power transmitting unit transversely offset from and located on the same side of said forwardly and rearwardly extending propeller shafts, and comprising a variable speed transmission in driving connection with the motor and having a power output shaft, a transverse shaft at right angles to the power output shaft, reversible gear means on said shafts selectively operative to drive the transverse shaft, differential gear mechanism mounted on and driven by the transverse shaft beyond the reversible gear means, coaxial transverse shaft members of different length driven by the differential and extending in the same direction from the end of the differential removed from the reversible gear means, and gear means forming separate driving connections between said shaft members and the respective propeller shafts.

3. A power transmitting unit for internal combustion motor vehicles having driven forward and rear wheel axles and separate longitudinally extending propeller shafts for driving the respective axles, said propeller shafts being offset from and mounted at the same side of the power transmitting unit, said power transmitting unit comprising a main casing portion, a variable speed transmission housed in said main casing portion, a casing extension at one end of the main casing portion and at one side projecting laterally beyond the main casing portion, the laterally projecting part of the casing extension being adapted to receive the adjoining ends of longitudinal propeller shafts, the output shaft of the variable speed transmission extending into said casing extension, a transverse shaft mounted in said casing extension at right angles to the output shaft, reversible gear means on said shafts selectively operative to drive the transverse shaft from one end, differential gear mechanism driven by the other end of the transverse shaft and mounted in said casing extension, coaxial transverse shaft members in said casing extension driven by the differential gear mechanism, and gear means in said laterally projecting casing extension forming separate driving connections between said shaft members and the respective propeller shafts.

RICHARD LANG.